(12) United States Patent
Stingl et al.

(10) Patent No.: US 6,345,061 B1
(45) Date of Patent: Feb. 5, 2002

(54) SHORT-PULSE LASER DEVICE

(76) Inventors: Andreas Stingl; Christian Spielmann; Ferenc Krausz, all of 24 Kleinengersdorferstrasse, A-2100 Korneuburg (AT)

( * ) Notice: Subject to any disclaimer, the term of this patent is extended or adjusted under 35 U.S.C. 154(b) by 0 days.

(21) Appl. No.: 09/254,335
(22) PCT Filed: Aug. 28, 1997
(86) PCT No.: PCT/AT97/00190
§ 371 Date: Mar. 5, 1999
§ 102(e) Date: Mar. 5, 1999
(87) PCT Pub. No.: WO98/10494
PCT Pub. Date: Mar. 12, 1998

(30) Foreign Application Priority Data

Sep. 6, 1996 (AT) .............................................. A 1582

(51) Int. Cl.⁷ ................................................ H01S 3/04
(52) U.S. Cl. ............................. 372/36; 372/66; 372/72
(58) Field of Search .............................. 372/21, 36, 41, 372/34, 70, 72, 66

(56) References Cited

U.S. PATENT DOCUMENTS

| | | | | |
|---|---|---|---|---|
| 4,429,394 A | * | 1/1984 | Guch, Jr. ..................... | 372/34 |
| 4,710,332 A |   | 12/1987 | Rosman ....................... | 264/60 |
| 4,951,294 A |   | 8/1990 | Basu et al. .................... | 372/75 |
| 5,079,772 A |   | 1/1992 | Negus et al. ................. | 372/18 |
| 5,084,886 A | * | 1/1992 | Martin ......................... | 372/36 |

FOREIGN PATENT DOCUMENTS

DE 4425636 2/1996

OTHER PUBLICATIONS

D.E. Spence et al., "60–fsec Pulse Generation From a Self–Mode–Locked Ti:Sapphire Laser"; Optic Letters, vol. 16, No. 1; Jan. 1, 1991, pp. 42–44.

R. Fluck et al., "Broadband Saturable Absorber for 10–fs Pulse Generation", *Optic Letters,* vol. 21, No. 10; May 15, 1996, pp. 743–745.

* cited by examiner

*Primary Examiner*—James W. Davie
*Assistant Examiner*—Davienne Monbleau
(74) *Attorney, Agent, or Firm*—Ostrolenk, Faber, Gerb & Soffen, LLP

(57) ABSTRACT

A passively mode-locked short pulse laser arrangement (1) comprising a laser resonator to which a pump beam (3) is supplied, a laser crystal (4), in particular a titanium-sapphire-(Ti:S-) laser crystal, and laser mirrors (M1 to M7), the laser crystal (4), which is subjected to a thermal load on account of the beam focussing, being mounted on a cooling body (10) provided for the removal of heat, which cooling body includes a bore (13) for the passage of the laser beam (3; 8), and on which a, particularly platelet-shaped, crystal mount (11) of a material with good heat conducting properties, preferably of copper, is provided for an improved removal of heat, the laser crystal (4) being held in an opening (14) of this crystal mount (11) by lateral abutment on oppositely arranged walls (15, 16) of the opening (14) of the crystal mount (11), the opening (14) in the crystal mount (11) being in alignment with the bore (13) in the cooling body (10).

18 Claims, 7 Drawing Sheets

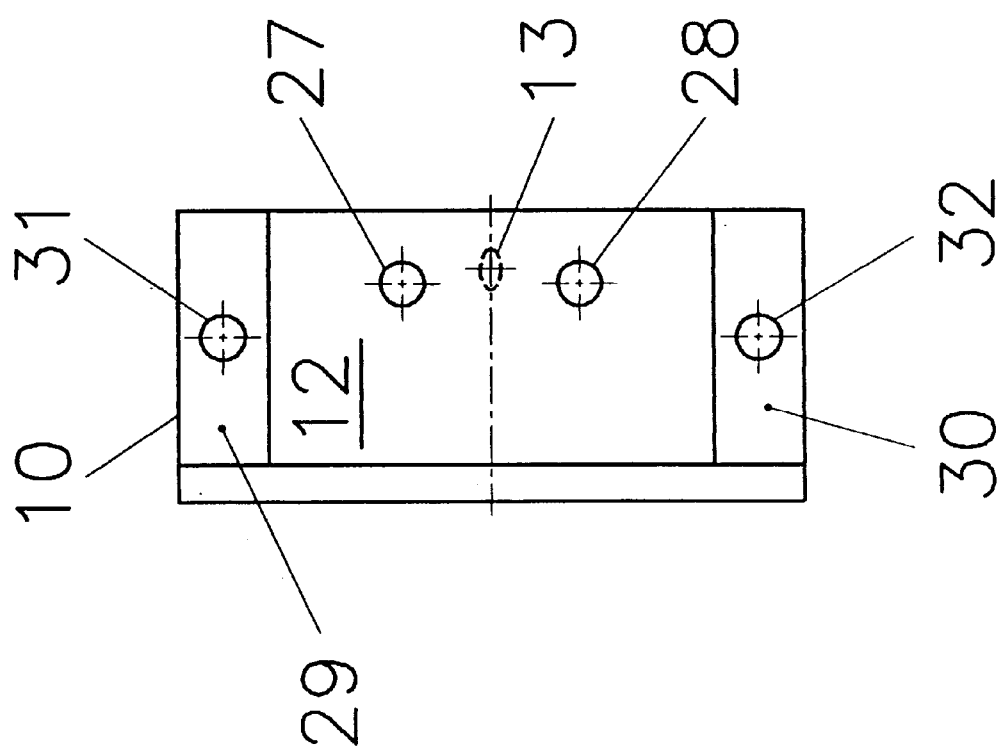

SHORT-PULSE LASER DEVICE

This application is a national stage entry pursuant 35 U.S.C. §371 of PCT International Application No. PCT/AT97/00190, filed Aug. 28, 1997.

The invention relates to a passively mode-locked short pulse laser arrangement comprising a laser resonator to which a pump beam is supplied, a laser crystal, in particular a titanium-sapphire-(Ti:S-)laser crystal, and laser mirrors, the laser crystal, which is subjected to a thermal load on account of the beam focussing, being mounted on a cooling body provided for the removal of heat, which cooling body includes a bore for the passage of the laser beam.

Such laser arrangements are used for scientific purposes, on the one hand, and can be used in material processing, on the other hand, particularly if fine structures are to be produced.

In the mode-locked state, a laser emits laser pulses instead of a continuous laser light (continuous wave (cw) operation), by storing energy and emitting it thereafter in pulse-like manner. The duration of the periods of these pulses will generally correspond to the round trip time of the pulses in the laser resonator, and, e.g., with a length of the linear resonator of 2 m, pulses with a frequency of approximately 75 MHz will be generated; here, the laser light pulse passes the laser resonator in both directions, which in the instant example will correspond to a length of 4 m. For mode-locking, a loss is periodically introduced (with the resonator round trip frequency)—e.g. by deflecting or blocking the laser beam—so that the laser begins to pulse. This results in a peak power of the pulses that is substantially higher (amounting to 100 kW to 200 kW, e.g.) than the output power of the laser in cw operation (which is 150 mW to 300 mW, e.g.).

Basically, it can be differentiated between two types of mode-locking.

In active mode-locking, a periodic loss is introduced by means of an active element, a modulator, which is supplied with energy from the outside via a driver, e.g. by the modulator periodically deflecting the laser beam from its direction of propagation. Thus, the laser is forced to perform its laser activity in those time intervals in which there is a lower loss, whereas the laser can store energy in those time intervals in which there are high losses.

In passive mode-locking, the effect of an optical non-linearity in the resonator is utilized, i.e. an optically non-linear element is arranged in the path of the laser beam, and this non-linear element changes its optical properties, such as the transmission or reflectivity, proportionally to the intensity of the laser beam. As such a non-linear element, the laser crystal itself may, e.g., be used which forms a so-called saturatable absorber in which the loss will become the lower the higher the intensity of the impacting laser light. By a fluctuation in the laser power, a pulse is generated which "sees" a substantially lower loss than does the laser in cw operation (cf. also U.S. Pat. No. 5,079,772 A). The laser body (solid state laser) consists of a non-linear material whose optical "thickness" varies with the field intensity distribution of the laser radiation. The non-linear index of refraction, e.g., is a function of the square of the field intensity, i.e. the laser beam whose field intensity distribution may be considered to be like a Gaussian curve, effectively "sees" an element with an optical thickness that varies over its cross-section in the case of a laser crystal having plane-parallel faces. In this manner, a focussing lense results from a plane-parallel non-linearity.

This optical Kerr effect may be utilized for mode-locking in two manners (so-called "Kerr-lens mode-locking"): In the case of the so-called "soft aperture" (cf. Spence et al., Optics Letters, Jan. 1, 1991, Vol. 16, p. 42–44), the pump beam (in Ti:S lasers the energy is supplied by means of green laser, such as, e.g., argon laser) is very much focussed in the laser crystal so that the resonator beam produced by the Ti—S laser (approximately 800 nm, infrared) may then take up the greatest part of the pump energy, i.e. may have the highest gain, if it has the smallest diameter. Thus, the higher the intensity, or the field strength, respectively, of the pulse, the more the laser pulse will be focussed and the greater its gain at any passage through the laser crystal, whereby its intensity is increased again. This positive feedback leads to a stable mode-locking.

In the case of the so-called "hard aperture" (cf. e.g. U.S. Pat. No. 5,079,772 A) the effect is utilized that an aperture restricts the resonator beam at a site where it has a larger diameter at that time when the intensity (field strength) is lower, and has a smaller diameter at that time when the intensity is higher and the resonator beam thus is focussed in the laser crystal.

Other passive mode-locking techniques, e.g. semiconductor-saturable absorbers, are also known, cf. e.g. R. Fluck et al., "Broadband saturable absorber for 10-fs pulse generation", Optics Letters, May 15, 1996, Vol. 21, No. 10, pp. 743–745.

To generate extremely short and thus high intensity pulses (in the femtosecond range) it is necessary to control the group dispersion in the resonator. Since pulses which are extremely short in the time range have a broad spectrum in the frequency range, there occurs the undesirable effect that in the laser crystal, the different frequency components "see" a different index of refraction and thus a different optical length of the laser crystal and thus are differently delayed when passing through the laser crystal. Thus, the pulses are lengthened again. To counteract this, the beam can be partitioned in terms of frequency by arranging optical prisms; the different frequency components will travel paths of different lengths, and in a further prism the beam is collimated (directed in parallel) again. As a consequence, the different frequency components will be delayed just reversely as in the laser crystal, whereby the dispersion introduced in the laser crystal is compensated again (cf. U.S. Pat. No. 5,079,772 A).

According to a further suggestion (e.g. Stingl et al., "Generation of 11-fs pulses from a Ti:sapphire laser without the use of prisms", Optics Letters, Feb. 1, 1994, Vol. 19, No. 3, pp. 204–206), special laser mirrors are used which are assembled of many (>40) layers, the different components of the wave lengths penetrating to different depths in the mirror before being reflected. Accordingly, the different components of the wave lengths of the laser beam are delayed in the mirror for different periods of time; the short-wave components are reflected at the surface, whereas the long-wave components are reflected at a deeper location in the mirror and thus experience a delay as compared to the short-wave components. The advantage of the last-mentioned method is a better dispersion compensation, whereby extremely short pulses can be produced directly from a resonator.

Irrespective of the dispersion compensation technique used in detail, it is also important for the dispersion control, for producing extremely short laser pulses (in the order of 10 fs and therebelow), to keep low the material dispersion—primarily in the laser crystal, and for this it is suitable to use a thin, i.e. short, laser crystal (that is a laser crystal having a short path length). For reasons of compensation, the laser crystal should have a high dotation (e.g., already within 2 mm, it absorbs more than 70%). To keep the pumping threshold as low as possible and to thus ensure an efficient conversion of pumping power into laser output power, the pumping beam and the resonator beam should be focussed as much as possible. The greatly reduced dimensions of the pumped volume of the laser crystal will thus lead to an increased thermal load.

Thus, it is an object of the invention to provide a laser arrangement of the initially defined type in which an improved heat removal is provided for the laser crystal so that an increased thermal load on the laser crystal—at comparatively small dimensions of the same—and consequently, an increase in the output power will be rendered possible.

The inventive laser device of the initialy defined type thus is characterised in that a crystal mount of a material with good heat conducting properties is provided on the cooling body and that the laser crystal is held in an opening of this crystal mount, with lateral abutment on oppositely arranged walls of the opening of the crystal mount, the opening in the crystal mount being in alignment with the bore in the cooling body.

In contrast to continuous wave solid state lasers, in which crystals having a length of from 5 to 10 cm are used, and to conventional femtosecond solid state lasers which use a crystal having a length of from 10 to 20 mm and a cross-section of 4×4 mm or larger, in this embodiment, laser crystals having a length of a few mm and an extremely small cross-section, in the order of 1 mm, e.g., can be used, whereby consequently also extremely short laser pulses (less than 10 fs) can be generated. This not only results in a reduction of costs of the laser crystal itself but, in combination with the above-indicated crystal mount which has a high thermal conductivity, it also enables an effective removal of heat from the laser crystal. In this connection it is also essential that by the small laser crystal dimensions, the path in the laser crystal for the heat removal from the pumped volume of the laser crystal lying in a middle zone (e.g., with a diameter of approximately 10 to 50 $\mu$m) to the surfaces of the crystal mount is greatly shortened. The crystal mount in turn transmits the heat to the cooling body whose temperature is held at 10° C., e.g. This temperature control on the cooling body may be coped with technically well (condensation problems may, however, occur if cooling is effected to below the temperature mentioned). Usually, the cooling body will be made of aluminum. By reducing the temperature in the interior of the crystal, the output power of the pulse laser can be improved. This, i.a., is a consequence of the fact that the lifetime of the electrons in the upper laser level decreases with an increasing temperature in the laser crystal. Tests using Ti:S laser crystals have shown that when using the crystal mount provided according to the invention, an output increase of up to 20% as compared to earlier embodiments using a cooling body could be achieved. From the nature of passive mode locking it follows that on account of the increased output power, further pulse shortening can be attained at equal pumping power.

To make adjusting the laser crystal in the crystal mount as easy as possible, it is particularly advantageous if the— e.g. platelet-shaped—crystal mount has a slit-shaped opening. In this embodiment, the laser crystal can be exactly positioned at the desired site within the slit-shaped opening. To allow also for an insertion and positioning of the laser crystal from the rim of the crystal mount, it is furthermore suitable if the slit-shaped opening extends from a rim of the crystal mount into the same. In this embodiment, the laser beam may be arranged also at or close to the rim of the crystal mount. Furthermore, for tightly clamping the laser crystal in the opening without special additional means, it has proven particularly advantageous if the slit-shaped opening extends as far as to shortly in front of the opposite rim of the platelet-shaped crystal mount, and if the material of the crystal mount that remains forms a link of the type of a (film) hinge, the two halves of the crystal mount which are separated from each other by the slit-shaped opening forming legs which are pivotable relative to each other. These legs tightly clamp the laser crystal between them. To avoid as far as possible an undesired tearing of the web between the legs, if the legs are to be straddled during insertion of the laser crystal, it is also advantageous if the insertion-type slit-shaped opening ends in a widened round.

To apply the clamping force, a pressure force as such could be applied onto the two legs from the outside, e.g. by a type of cramp or the like device. A particularly simple form of force application is, however, possible if the legs have transverse bores extending in a direction transverse to the slit-shaped opening for accommodating a bracing element which pivots the legs relative to each other. In this connection it is a particularly advantageous further development that the transverse bore in one leg is an overdimensioned smooth through-bore and the transverse bore in the other leg is provided with an internal thread and that the bracing element is a straining screw whose shaft freely extends through the smooth through-bore of the one leg and is screwed into the threaded bore of the other leg. In this embodiment, thus simply a tightening or clamping screw is provided, by the rotation of which the two legs can be braced or straddled so as to tightly clamp or release the laser crystal between them.

To provide for a better access to the laser crystal held in the crystal mount, for cleaning purposes, it has also proven suitable if the opening of the crystal mount has a chamfered rim at its side facing away from the cooling body, the laser crystal extending as far as to the chamfer.

As has already been mentioned, the embodiment according to the invention can particularly be used in combination with comparatively small laser crystals, and thus it is particularly advantageous if the laser crystal has the form of a parallelepiped having thickness dimensions in the order of approximately 1 mm and a length of approximately 2 mm, the diameter of the pumped volume being in the order of 10 $\mu$m.

The invention will now be explained in more detail by way of exemplary embodiments illustrated in the drawings, to which, however, it shall not be restricted. In detail, FIG. 1 shows a schematical illustration of a short pulse laser arrangement;

FIG. 4 is a top view onto the cooling body without crystal mount;

Figure 1:
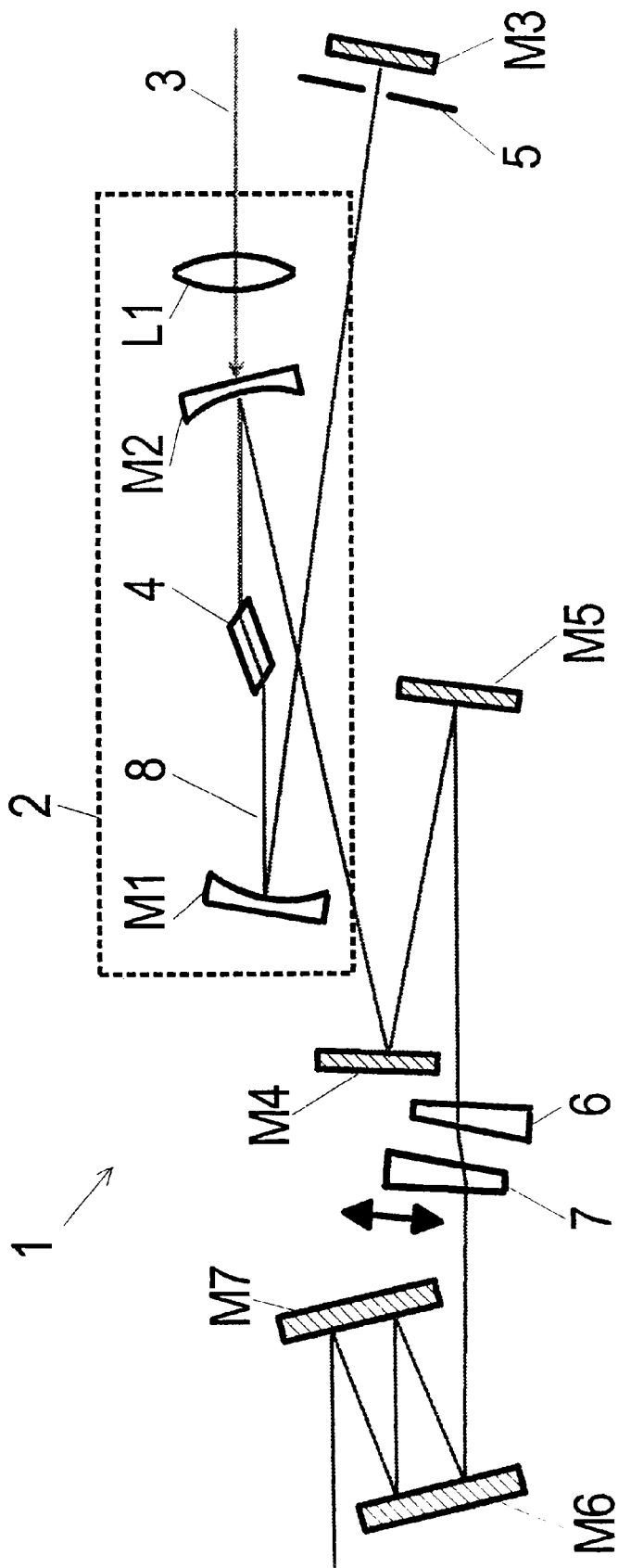

In FIG. 1, a short pulse laser arrangement 1 is schematically illustrated, in which the afore-mentioned "Kerr-lens mode-locking" principle is used for the short pulse generation, and the afore-mentioned laser mirrors realized in thin layer technique are used for dispersion control, wherein, with such a laser arrangement, the invention can be employed with particular advantage.

According to FIG. 1, the laser arrangement 1 comprises a laser head 2 indicated in broken lines, to which a pump beam 3, an argon laser beam, e.g., is supplied. For the sake of simplicity, the pump laser (argon laser, e.g.) itself has been omitted, this pump laser being part of the prior art.

After passing through a lense L1 and a semitransparent laser mirror M2, the laser beam passes through a laser crystal 4, a titanium:sapphire (Ti:S) solid state laser crystal in the present example, whereupon it impacts on a laser mirror M1 and is reflected by the latter to a laser mirror M3 outside of the laser head 2, by traversing an aperture 5 having a vertical slit. This laser mirror M3 reflects the laser beam back to the mirror M1 from where the laser beam is reflected back to the laser mirror M2, thereby passing the laser crystal 4 a second time. From there, the laser beam is then reflected via further laser mirrors M4, M5 and a semitransparent, wedge-shaped output coupler mirror 6, whereby the laser resonator is formed. Via the output coupler mirror 6, the laser beam is furthermore decoupled, a compensation platelet 7 as well as mirrors M6, M7 produced in thin film technique providing for a dispersion compensation as well as for preventing the occurrence of undesired reflections in the direction towards the laser resonator. The resonator beam obtained in the manner described in the laser head 2 is denoted by 8.

The laser crystal 4 is a plane-parallel body (a parallelepiped) that is optically non-linear and forms a Kerr element that has a greater effective optical thickness for higher field strengths of the laser beam, whereas it has a smaller effective thickness when the field strength, or intensity, respectively, of the laser beam is lower. This Kerr effect which is known per se is utilized for autofocussing of the laser beam, i.e. the laser crystal 4 forms a focussing lense for the laser beam (resonator beam 8).

In the embodiment illustrated, furthermore, for mode-locking, the aperture 5 is used which restricts the resonator beam 8 at a site where it will have a larger diameter when the intensity or field strength of the fluctuating laser beam is lower, whereas, when the intensity of the laser beam is higher because of the fluctuation, i.e., when the resonator beam is focussed in the laser crystal, it will have a smaller diameter.

Mirrors M1 to M7 are produced in thin-film technique, i.e. each of them is built up with many layers which exert their function at the reflection of the ultra-short laser pulse having a wide band spectrum. The various wave length components of the laser beam penetrate into the layers of the respective mirror to various depths before they are reflected. Thereby, the various wave length components are delayed at the respective mirror for different periods of time; the short wave components are reflected more outwardly, while the long wave portions are reflected at a greater depth in the mirror. Thereby, the long wave components are delayed in time relative to the short wave components. In this manner, a dispersion compensation is obtained insofar as pulses which are particularly short in time (preferably in the range of 10 femtoseconds and therebelow) have a broad frequency spectrum; as a consequence, the various frequency components of the laser beam in the laser crystal 4 which is optically non-linear as mentioned before, "see" different indices of refraction, i.e., the optical thickness of the laser crystal 4 is different for the various frequency components, and thus the various frequency components are differently delayed when passing through the laser crystal 4. This effect is counteracted by the aforementioned dispersion compensation at the thin film laser mirrors M1 to M7.

Also with a view to the slight delays per reflection on a mirror M1 to M7, it is suitable or required to use a comparatively thin laser crystal 4, which, on the other hand, should have a high dotation for obtaining the desired effect, wherein, furthermore, the pump beam 3 and the resonator beam 8 are to be focussed as much as possible. This, however, results in a high thermal load on the laser crystal 4.

Usually, the laser crystal is mounted on a metallic cooling body which is cooled to a temperature of approximately 10° C. Cooling to a lower temperature, however, is not possible because of the risk of condensation occurring. This in turn means that the temperature of the laser crystal, and in particular of the pumped volume of the laser crystal, becomes relatively high, without the possibility of providing for an appropriate cooling from the sides of the cooling body. Particularly with the present laser arrangement 1, this is a problem, since, as mentioned before, a laser crystal 4 having small dimensions and a high dotation ought to be used, wherein, as a consequence of the high focussing of the pump beam 3 and of the resonator beam 8, respectively, the laser crystal 4 is heated extremely high.

Figure 2:
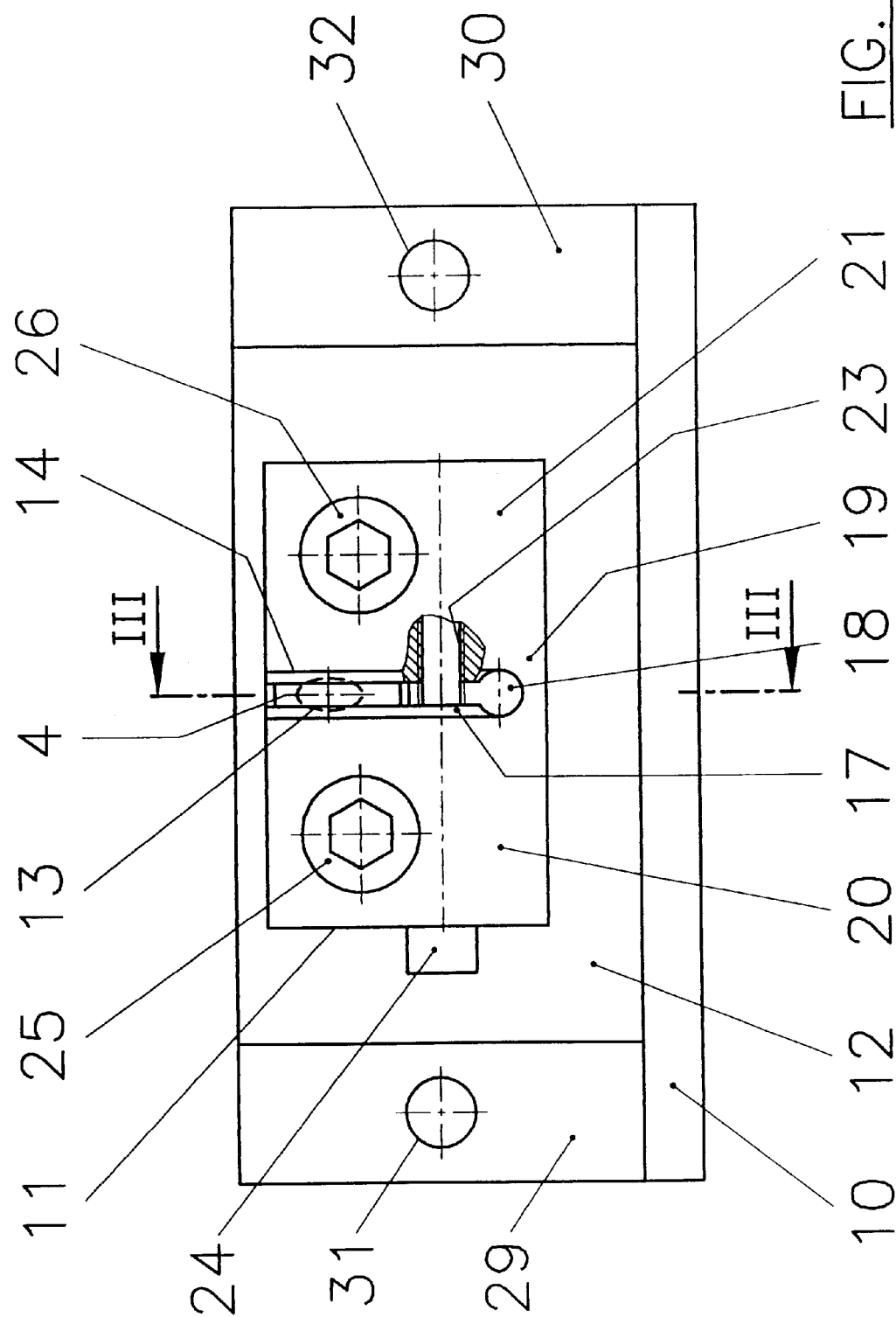
FIG. 2 shows a top view onto a cooling body including cooling mount for the laser crystal of such a laser arrangement, according to arrow II in FIG. 3.
Figure 3:
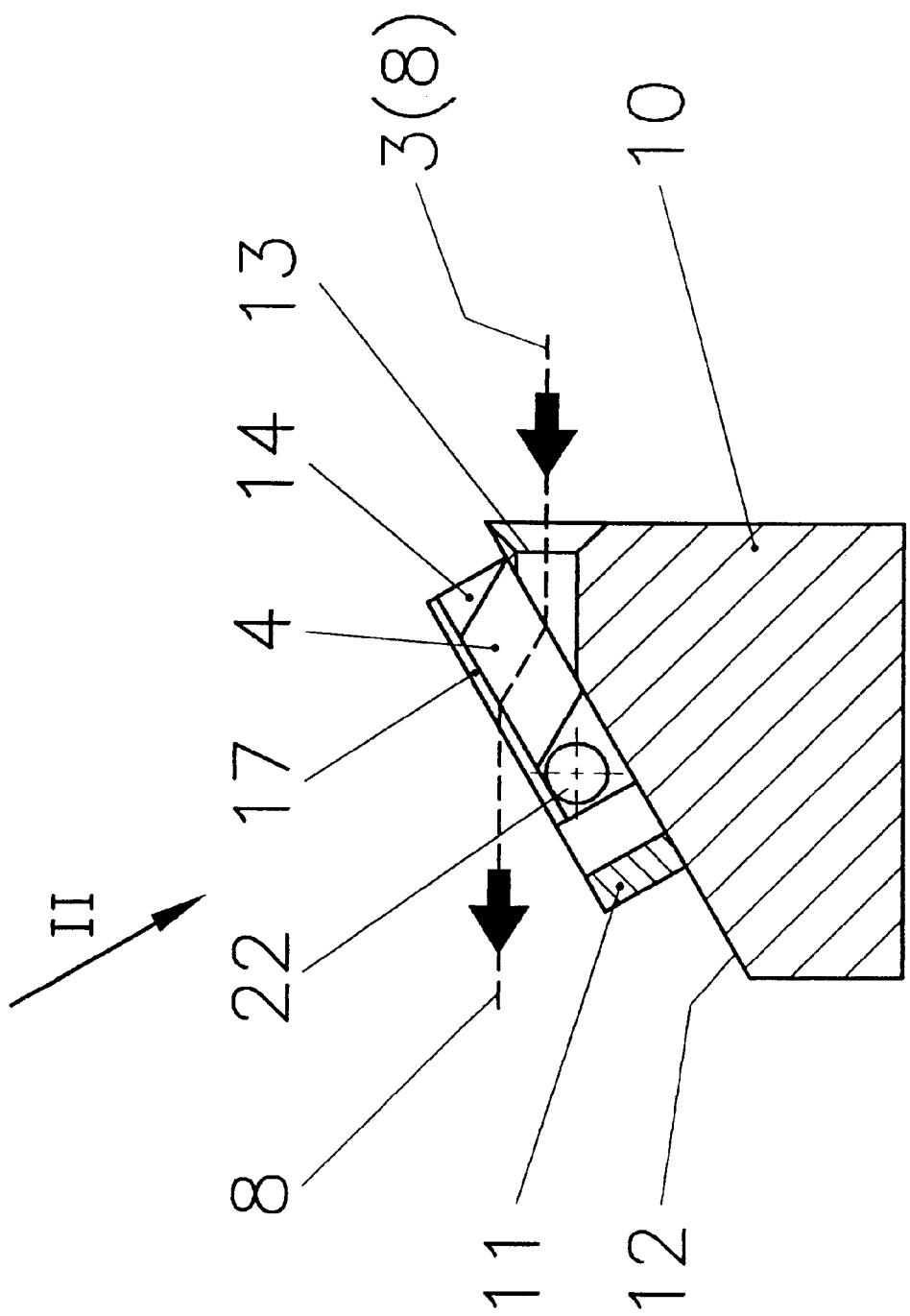
FIG. 3 shows a cross-section through the cooling body and the crystal mount including the laser crystal, according to line III—III in FIG. 2.

From FIGS. 2 and 3, an arrangement which at least at present is particularly preferred and considered to be particularly advantageous is illustrated, comprising a cooling body 10 and mounted thereon, a crystal mount 11 for the laser crystal 4 (FIG. 3). The cooling body 10, which may, e.g., be made of aluminum (anodized in black), is conventional per se and has a slant upper surface 12 at which a bore 13 for the resonator beam 8 or the pump beam 3, respectively, ends.

Figure 6:
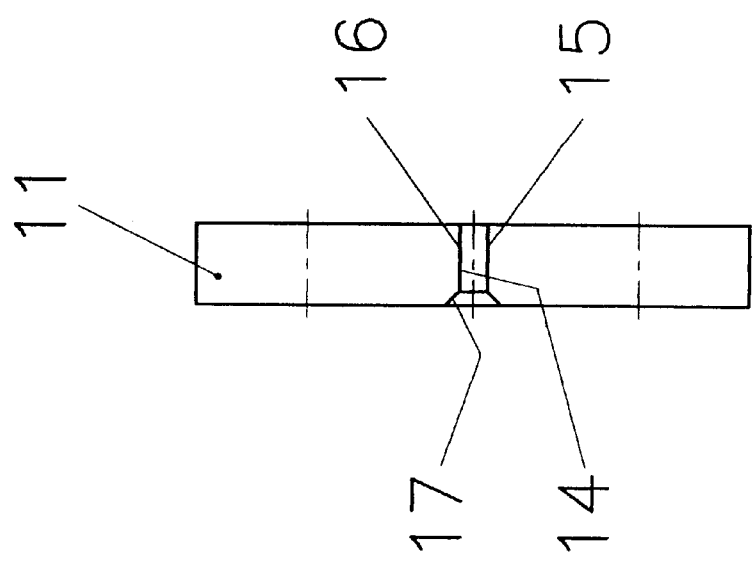
FIG. 6 is a side view of the crystal mount according to arrow VI in FIG. 5.
Figure 5:
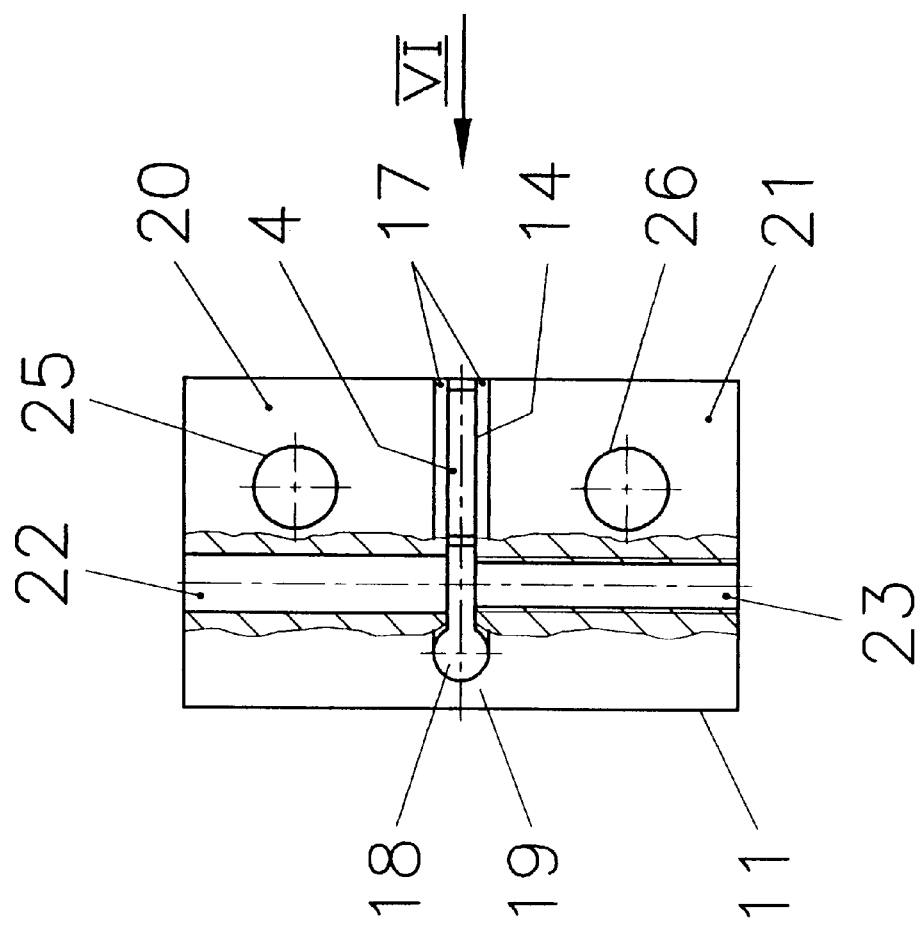
FIG. 5 is a top view, partly broken away, onto the platelet-shaped crystal mount.

The crystal mount 11 which, as such, could also be made in one piece with the cooling body 10, preferably is a separate structure part and particularly, as is also apparent from FIGS. 5 and 6, designed in the form of a platelet of a metal having good heat conducting properties, in particular Cu, which is attached on the slant upper surface 12 of the cooling body 10, lying plane thereon. The crystal mount 11 is directed with a slit-shaped opening 14 towards the laser beam bore 13. In this slit-shaped, indentation-type opening 14, the laser crystal 4 is tightly clamped, abutting with surface contact laterally on the walls 15, 16 (cf. FIG. 6) of the platelet-shaped crystal mount 11. The upper rim of the opening 14 is chamfered or canted, as indicated at 17 in FIGS. 5 and 6. The chamfer 17 extends as far as to the upper side of the laser crystal 4 (FIGS. 2 and 3) in the opening 14, whereby the laser crystal can be cleaned more easily if need be.

The opening 14 ends inwardly in the crystal mount platelet 11 in a widened round 18, by maintaining a web 19 of a thickness of approximately 1 mm, e.g., which interconnects the thus-obtained halves or legs 20, 21 of the crystal mount platelet 11 in film-hinge manner. The web 19 is deformable to a certain extent so that the legs 20, 21 can be somewhat pivoted relative to each other about the hinge thus formed by the web 19, i.e. braced together or straddled. The metal of the crystal mount 11, preferably copper, allows for the respective deformation of the web 19 for pivoting the legs 20, 21. In this manner, the laser crystal can simply be braced in the slit-shaped opening 14 by bracing the legs 20, 21 and can be held there in frictional engagement.

For these bracing or clamping purposes, the legs 20, 21 each have a transverse bore 22, 23, the transverse bore 22 in a leg 20 being a somewhat larger, smooth through-bore, whereas the transverse bore 23 in the other leg 21 is a threaded bore. This threaded bore 23 may be a through bore, as illustrated, it could, however, be a blind bore open merely towards the through-bore 22. A tightening screw 24 (FIG. 2) serving as a bracing element is inserted through the smooth through-bore 22 and screwed into the threaded bore 23 so as to effect drawing together of the legs 20, 21.

From FIGS. 2 and 5 furthermore bores and screws 25, 26 for fastening the crystal mount 11 on the cooling body 10 are apparent, which cooling body has corresponding threaded bores 27, 28 (FIG. 4). Via lateral flanges 29, 30 which are provided with screw bores 31, 32, the cooling body 10 may further be attached to a holding means or the like not illustrated in detail and comprising a coolant supply, as is conventional per se.

Figure 7:
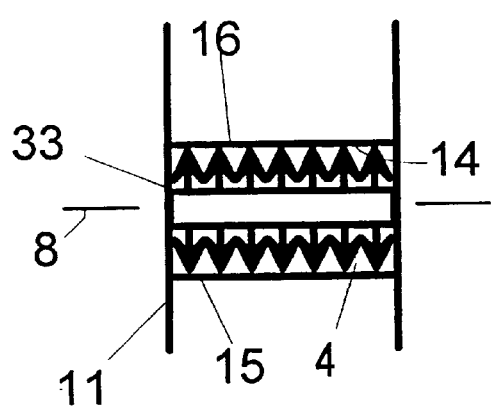
FIG. 7 is a schematical top view onto the laser crystal as clamped in the—merely partially illustrated—crystal mount, to illustrate the short paths for the removal of heat.

FIG. 7 schematically illustrates the removal of heat in the present laser arrangement, it being visible that extremely short paths indicated by arrows exist in the laser crystal 4 for removing the heat from the pumped volume 33 in the interior of the laser crystal 4 to the side faces of the laser crystal 4 and thus to the side walls 15, 16 of the bore 14 in the crystal mount 11. Hence results an extremely low heat resistance between the pumped volume 33 and the cooled walls 15, 16 between the side faces of the laser crystal 4. Thereby also the laser crystal 4 can be held at a sufficiently low temperature in its interior, in the region of the pumped volume 33, without any problems. The short paths (cf. arrows in FIG. 7) for the removal of heat in the laser crystal 4 are of particular importance since the heat conductivity of the material of the laser crystal 4 is comparatively low (the heat conductivity of sapphire (host crystal for titanium-doted titanium sapphire) at 500K: k(500K)=25 W/(mK), and at 300K: k(300K)=46 W/(mK)).

Figure 8:
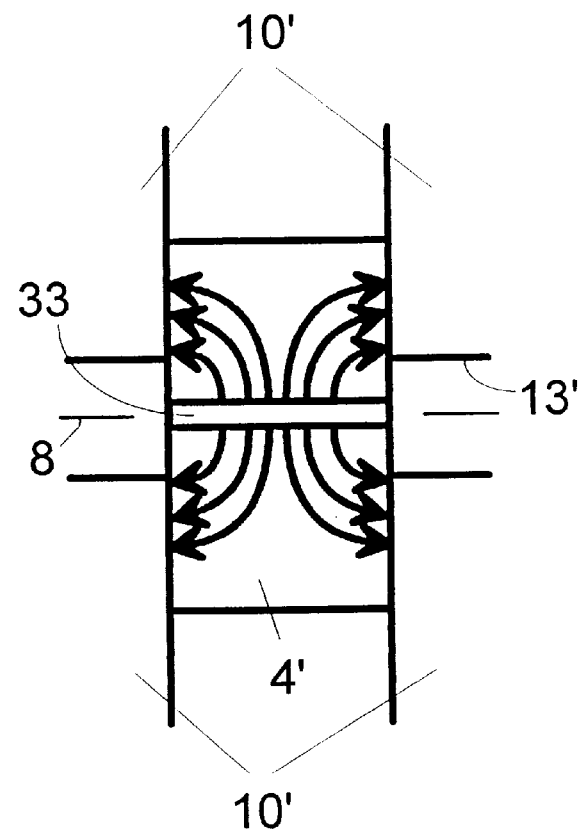
FIG. 8 shows on an approximately comparable scale, the arrangement of a laser crystal in a cooling body according to earlier laser arrangements, for the purpose of comparison.

In FIG. 8, for comparison purposes, a conventional arrangement of a laser crystal 4' of comparable thickness, yet greater width, is mounted in a cooling body 10' having a bore 13' for the laser beam. Curved arrows illustrate the paths for the removal of heat from the pumped volume 33 to the cooling surfaces of the cooling body 10' which contact the laser crystal 4. It is apparent that in such an arrangement, the overall heat resistance is higher since the path between the pumped volume 33 and the cooled areas is larger. Thereby, however, the output power of the laser is lower, and in the known arrangement also the lifetime of the laser is lower than in the arrangement according to FIGS. 2 to 7, because of the higher temperatures in the interior of the laser crystal 4', in the region of the pumped volume 33.

The surfaces of the crystal mount 11 which are in contact with the laser crystal 4 preferably are polished, with a view to a good heat transition. Furthermore, at those sites of contact where heat transition takes place, such as, in particular, between the cooling body 10 and the crystal mount 11, pastes having good heat conductivity may be used, as known per se. Instead of such heat conducting pastes, also indium foils may be used to attain a good heat transition. These indium foils are soft and thus cling closely to the contact areas, a large heat transition surface and good heat transition being achieved.

Figure 9:
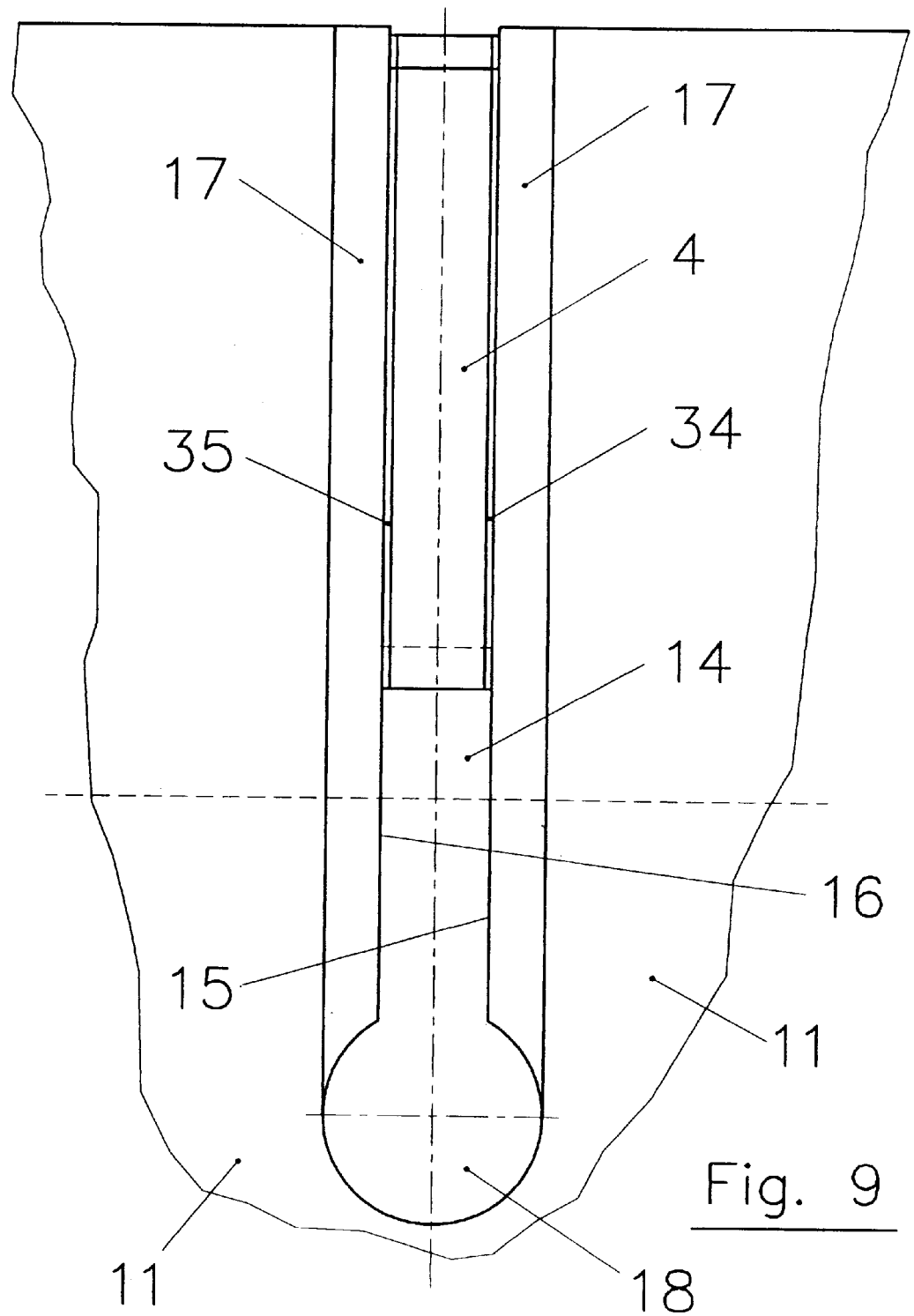
FIG. 9 is a detail representation of the region of the opening in the crystal mount on a further enlarged scale, for illustrating indium foil intermediate layers.

Such an indium foil intermediate layer is particularly preferred in the region of the laser crystal 4 and the walls 15, 16 of the opening 14 accommodating the laser crystal 4, as is also apparent from FIG. 9. There, indium foils 34, 35 are attached on either side of the laser crystal 4, between the latter and the cooled walls 15, 16 of the opening 14 of the irregularities in the crystal surfaces and in the walls 15, 16, respectively, and thus enhances the conduction of heat.

What is claimed is:

1. A passively mode-locked short pulse laser arrangement comprising:

a laser resonator to which a pump beam is supplied, a laser crystal, and laser mirrors for reflecting a laser beam, wherein the laser crystal, which is subjected to a thermal load on account of beam focusing, is mounted on a cooling body provided for the removal of heat, which cooling body includes a bore extending therethrough for the passage of the laser beam, and further comprising a crystal mount which is platelet-shaped, and which is mounted onto the cooling body, said crystal mount having an opening extending therethrough from one face to an opposite face in alignment with the bore in the cooling body, with the laser crystal held in this opening, said crystal mount being comprised of heat conductive material and embracing the laser crystal with lateral clamping by oppositely arranged walls of the opening of the crystal mount.

2. A short pulse laser arrangement according to claim 1, wherein the crystal mount has a slit-shaped opening which extends from a rim of the crystal mount into the same.

3. A short pulse laser arrangement according to claim 2, wherein the slit-shaped opening extends as far as to shortly in front of an opposite rim of the crystal mount, and the material of the platelet-shaped crystal mount remaining there forms a link of the type of a hinge, with two halves of the crystal, which are separated from each other by the slit-shaped opening, forming legs which are pivotable relative to each other.

4. A short pulse laser arrangement according to claim 3, wherein the slit-shaped opening is formed by an incision ending in a widened round.

5. A short pulse laser arrangement according to claim 3, wherein the legs have transverse bores extending in a direction transverse to the slit-shaped opening for accommodating a bracing element which pivots the legs relative to each other.

6. A short pulse laser arrangement according to claim 5, wherein the transverse bore in one leg is an overdimensioned smooth through-bore and the transverse bore in the other leg is provided with an internal thread, and the bracing element is a tightening screw with its shaft freely extending through the smooth through-bore of the one leg and screwed into the threaded bore of the other leg.

7. A short pulse laser arrangement according to claim 1, wherein the opening of the crystal mount has a chamfered rim at its side facing away from the cooling body, the laser crystal extending as far as to the chamber.

8. A short pulse laser arrangement according to claim 2, wherein the opening of the crystal mount has a chamfered rim at its side facing away from the cooling body, the laser crystal extending as far as to the chamber.

9. A short pulse laser arrangement according to claim 3, wherein the opening of the crystal mount has a chamfered rim at its side facing away from the cooling body, the laser crystal extending as far as to the chamber.

10. A short pulse laser arrangement according to claim 4, wherein the opening of the crystal mount has a chamfered rim at its side facing away from the cooling body, the laser crystal extending as far as to the chamber.

11. A short pulse laser arrangement according to claim 5, wherein the opening of the crystal mount has a chamfered rim at its side facing away from the cooling body, the laser crystal extending as far as to the chamber.

12. A short pulse laser arrangement according to claim 6, wherein the opening of the crystal mount has a chamfered rim at its side facing away from the cooling body, the laser crystal extending as far as to the chamber.

13. A short pulse laser arrangement according to claim 1, wherein the laser crystal has the form of a parallelepiped having thickness dimensions in the order of approximately 1 mm and a length of approximately 2 mm, the diameter of the pumped volume being in the order of 10 mm.

14. A short pulse laser arrangement according to claim 2, wherein the laser crystal has the form of a parallelepiped having thickness dimensions in the order of approximately 1 mm and a length of approximately 2 mm, the diameter of the pumped volume being in the order of 10 mm.

15. A short pulse laser arrangement according to claim 3, wherein the laser crystal has the form of a parallelepiped having thickness dimensions in the order of approximately 1 mm and a length of approximately 2 mm, the diameter of the pumped volume being in the order of 10 mm.

16. A short pulse laser arrangement according to claim 4, wherein the laser crystal has the form of a parallelepiped having thickness dimensions in the order of approximately 1 mm and a length of approximately 2 mm, the diameter of the pumped volume being in the order of 10 mm.

17. A short pulse laser arrangement according to claim 5, wherein the laser crystal has the form of a parallelepiped having thickness dimensions in the order of approximately 1 mm and a length of approximately 2 mm, the diameter of the pumped volume being in the order of 10 mm.

18. A short pulse laser arrangement according to claim 6, wherein the laser crystal has the form of a parallelepiped having thickness dimensions in the order of approximately 1 mm and a length of approximately 2 mm, the diameter of the pumped volume being in the order of 10 mm.

* * * * *